United States Patent

Mayse et al.

[15] 3,672,127

[45] June 27, 1972

[54] PHASE SEPARATOR FOR IMMISCIBLE FLUIDS

[72] Inventors: Weldon D. Mayse; Frederick D. Watson, both of Houston, Tex.

[73] Assignee: Petrolite Corporation, St. Louis, Mo.

[22] Filed: May 26, 1970

[21] Appl. No.: 40,624

[52] U.S. Cl. .................................. 55/174, 55/206, 204/308
[51] Int. Cl. ..................................................... B01d 19/00
[58] Field of Search .................................. 55/45, 166–170, 55/174–176, 192, 193, 206; 204/302, 306, 308

[56] References Cited

UNITED STATES PATENTS

| | | | |
|---|---|---|---|
| 3,432,991 | 3/1969 | Sander et al. | 55/175 X |
| 3,207,686 | 9/1965 | Jarvis et al. | 204/302 |
| 2,783,854 | 3/1957 | Lovelady et al. | 55/174 |
| 3,377,777 | 4/1968 | Isomura | 55/193 X |
| 3,255,571 | 6/1966 | Walker et al. | 204/308 X |
| 2,717,081 | 9/1955 | Wilson | 55/174 X |
| 2,963,414 | 12/1960 | Waterman | 204/302 |
| 3,401,501 | 9/1968 | Meyer | 204/302 X |
| 3,437,581 | 4/1969 | Rathburn | 204/302 X |
| 3,458,429 | 7/1969 | Watson et al. | 204/302 |
| 3,470,902 | 10/1969 | Hackman | 73/96 X |

Primary Examiner—Reuben Friedman
Assistant Examiner—R. W. Burks
Attorney—Emil J. Bednar and Sidney B. Ring

[57] ABSTRACT

A phase separator for resolving a mixture of immiscible fluids such as crude oil and water phases. The separator comprises a vessel with an inlet, oil and water outlets and divided by a baffle into inlet and outlet separation zones. A metering orifice in the baffle discharges all oil from the inlet separating zone into the outlet separation zone responsively to a substantial pressure differential whose magnitude is automatically determined by the rate of crude oil inflow into the vessel. A large opening in the baffle provides for unobstructive flow of the water between the separation zones in a lower horizon of the vessel. A heater in the inlet separation zone promotes an initial separation into oil and water phases. Water is removed at the lower horizon in the vessel to maintain the oil-water interfacial zone at a relative fixed level. An electric field between electrodes in the outlet separation zone promotes further separation of the liquids in the outlet separation zone. A second large opening in the baffle at the upper horizon allows gas to pass freely between separations zones for removal through a backpressure valve. The total open area of the orifice is selected so that the oil-water interfacial zone remains below the upper horizon in the outlet separation zone and above the lower horizon in the vessel under all normal rates of flow of incoming liquids through the inlet.

28 Claims, 3 Drawing Figures

Weldon D. Mayse
Frederick D. Watson
INVENTORS

BY Emil J. Bednar

ATTORNEY

PHASE SEPARATOR FOR IMMISCIBLE FLUIDS

BACKGROUND OF THE INVENTION

1. Field of the Invention

The present invention relates to a phase separator for resolving mixtures of immiscible fluids and particularly relates to a novel method for control of the fluid passing from one separation zone to another in a common vessel.

2. Description of the Prior Art

The resolution of mixtures of immiscible fluids in a vessel having a single separation zone extending throughout its length permits a high efficiency of operation. Only one level controller for an outlet valve is required to maintain an interface between any two vertically superimposed fluids in the vessel. For example, the resolution of a mixture of oil and water in such a vessel forms a layer of superimposed oil over a body of water. The water is removed through an outlet regulated by a control valve actuated through a level controller. The level controller maintains the oil-water interface at a certain horizon within the vessel. The oil is removed through a second outlet which usually contains only a back-pressure valve. If there is added to this system a gas phase, the oil outlet then requires a control valve which is actuated by a level controller sensing the gas-oil interface. Whatever type of mechanism is employed in such a single separation zone, there is a very minimum of requirements for level controllers to operate various outlet valves so as to maintain the interfaces between immiscible fluids at desired horizons.

Two or more separation zones formed by pressure-type baffles in a vessel, have required each separation zone to have individual sets of level controllers. Thus, the phase separator with multi-separation zones has become encumbered by a plurality of level controllers and valves with special take-offs and the like so that the various interfaces in each separation zone are maintained at desired horizons in the vessel. Otherwise, the desired phase separation result can not be obtained. This complicated system produces an expensive to manufacture phase separator and further requires expensive maintenance to ensure that all the level control systems are operating under acceptable conditions. Otherwise, the phase separator with a plurality of separation zones can not operate at its designed efficiency.

It is the purpose of the present invention to provide a phase separator having a plurality of separation zones within a single vessel wherein immiscible fluids may be resolved by a novel arrangement which permits the use of a very minimum of control valves actuated by the respective interfaces between immiscible fluids in much the same complexity as the phase separator having only a single separation zone.

SUMMARY OF THE INVENTION

In accordance with the present invention, there is provided a phase separator comprising a vessel for containing superimposed bodies of immiscible fluids. These fluids include first and second fluids with the second fluid being of higher density than the first fluid and separated vertically by an interfacial zone. Baffle means having an imperforate portion isolate the vessel into a plurality of separation zones. A first passage means in the imperforate portion provides for discharging the first fluid from one of the separation zones into another of the separation zones with a substantial pressure differential thereacross compared to unobstructed flow. The magnitude of the pressure differential varying with the amount of the first fluid entering the vessel. A second passage means provides for unobstructed flow of the second fluid between the separation zones at a lower horizon in the vessel. The fluids are introduced into the vessel through an inlet into one of the separation zones. A first outlet provides for removing the first fluid from an upper horizon of the other of the separation zones. A second outlet provides for removing the second fluid from the separation zones adjacent the lower horizon. Control means associated with the second outlet maintain the interfacial zone immediate the upper and lower horizons. The total open area of the first passage means in each baffle means is correlated to the vertical dimension between the upper and lower horizons so that the interfacial zone remains below the upper horizon in the separation zones and above the lower horizon in the vessel under all normal rates of flow of incoming fluid through the inlet.

DESCRIPTION OF SPECIFIC EMBODIMENTS

Figure 1:
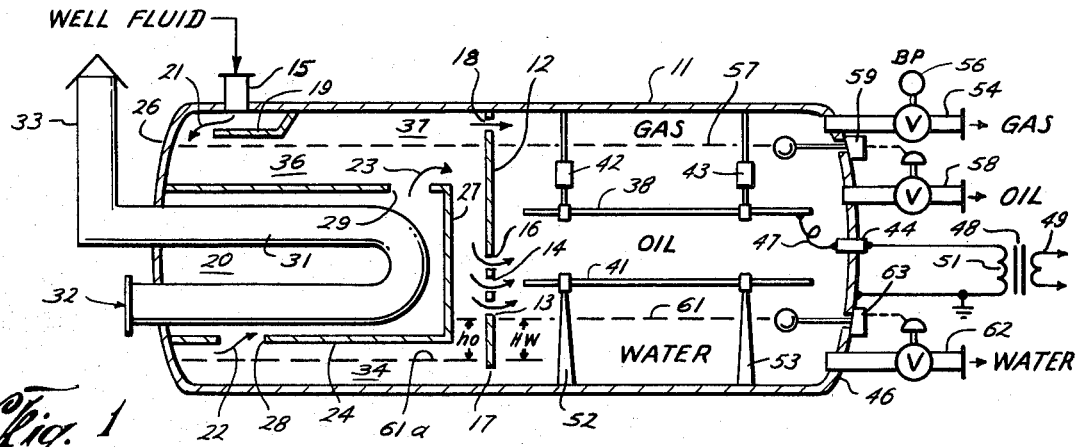
FIG. 1 is a vertical sectional view of a phase separator employing a heated inlet separation zone and an outlet separation zone containing energized electrodes creating an electric field.

Referring now to FIG. 1, there is illustrated a preferred embodiment of the phase separator of this invention. A mixture of well fluid comprising three immiscible fluids such as gas, crude oil and water may be separated in this phase separator. However, the present invention can be used to resolve mixtures of other immiscible fluids. The phase separator comprises a vessel 11 of any suitable construction but usually is a horizontal steel tank suitable to enclose the immiscible fluids at whatever pressure, temperature and other conditions may be encountered. A baffle 12 divides the vessel 11 into an inlet separation zone and an outlet separation zone to the left and right sides, respectively, of the baffle. The baffle 12 is a nonepressure baffle and may take any suitable form such as a thin sheet of steel. The baffle 12 is not required to sustain the entire fluid pressure exerted by the contents of the vessel 11. For practical purposes, the non-pressure baffle 12 is required only to withstand a differential fluid pressure not over a few inches of water or about 5 ounces. The baffle 12 may be welded at its outer periphery to the vessel 11, or secured in any other manner, providing an imperforate portion which segregates fluidwise the vessel 11 into two separation zones relative to the fluid contained therein.

The baffle 12 contains a first passage means for discharging crude oil from the inlet separation zone into the outlet separation zone. The first passage means may take any suitable form for the present invention such as one or more metering orifices 13, 14 and 16. The function of these orifices will be described in greater detail later in the present description. The baffle 12 also contains a relatively large opening, such as passageway 17, which provides for an unobstructed flow of water between the separation zones. The baffle 12 also contains a second relatively large opening 18 at an upper horizon to permit the passage of gas freely between the separation zones.

An inlet 15 introduces the mixture of fluids into the inlet separation zone. These fluids pass from the inlet 15 and impinge upon a splash plate 19 which effects an initial separation of gas from the liquid constituents. The gas (being less dense) accumulates at the top of the vessel 11. The remaining fluids pass downwardly, as indicated by the arrows 21 and 22, flowing by heater 20 of any suitable construction. For example, the heater 20 may be formed by a cylindrical member 24 with one end secured to the head 26 of the vessel 11 and the other end sealed by the plate 27. A fluid inlet 28 at the lower portion of the cylindrical member 24 and an outlet 29 diagonally opposite thereto provide for fluid flows within the heater 20. Mounted within the cylindrical member 24 and extending through the head 26 is a U-fire tube 31 having an inlet 32 and an exhaust portion 33. The fire tube 31 may be of conventional design wherein an air and gas burning mixture generates heat directly and indirectly transferred to the liquids contained in the inlet separation zone of the vessel 11. The products of combustion are vented through the outlet 33 from the heater 20. A particular construction for the heater 20 within the inlet separation zone has been described but it is apparent that any of a variety of heaters may be employed, if desired.

The fluids pass downwardly about the cylindrical member 24, flow through the inlet 28 along the substantial entirety of the fire tube 31, and then pass upwardly through the outlet 29 into the inlet separation zone adjacent the baffle 12. As a result of heating the fluid mixture, additional gas can separate and pass upwardly to merge with the gas body 37 residing at the top of the vessel 11. Large quantities of water can separate and fall downwardly forming a body of water 34 at a lower horizon in the vessel 11 as the heated oil flows over plate 27, as indicated by arrow 23. A relatively purified body of crude oil 36 resides beneath the gas body 37 and the subtended water body 34.

The heated crude oil passes from the inlet separation zone through the orifices 13, 14 and 16 in the baffle 12 into the outlet separation zone in the vessel 11. In the outlet separation zone, the heated oil is subjected to the action of an electric field which enhances the coalescence of further quantities of residual water from the crude oil phase. For this purpose, a set of electrodes 38 and 41 are mounted in the vessel 11. The electrode 38, of any suitable design, is supported from the vessel 11 by insulators 42 and 43 and support structures to the vessel 11. The electrodes are usually foraminous but may have any other structure according to well known practices. The electrode 38 connects to a source of power through an insulating bushing 44 carried in the head 46 of the vessel 11. A conductor 47 interconnects the electrode 38 via the bushing 44 with an external power supply such as a transformer 48 having a primary 49 connected to a power line source and a secondary 51 connected at one terminal to the electrode 38 and with the other terminal connected to the electrode 41 or vessel ground. The electrode 41, as the "grounded" electrode, is supported by mounting legs 52 and 53 from the vessel 11. Thus, energization of the transformer 48 creates an electric field between the electrodes 38 and 41. The electric field should be of sufficient intensity to resolve water from the incoming heated oil into the outlet separation zone. Generally, the electrodes 38 and 41 are spaced apart 4–10 inches and will be energized by application of a suitable potential such as between 10 and 30,000 volts from the transformer 48.

The electric field in the outlet separation zone, coalesces from the heated oil substantially all of the coalescible water which falls downwardly to merge in the body of water 34 in the lower horizon of the vessel 11. Any gas, which may be released in the electric field, migrates upwardly into the gas body 37. The gas is removed through an outlet 54. A suitable back-pressure valve 56 in outlet 54 maintains the contents of the vessel 11 under a suitable super-atmospheric pressure. The interfacial zone 57 between the gas and oil bodies in the outlet zone remains at a suitable horizon by withdrawing oil at an upper horizon in regulated amounts through the outlet 58 by employing a float-type level controller 59. The interface 61 between the oil and water bodies in the outlet separation zone is maintained at a suitable horizon by removing water adjacent the lower horizon in regulated amounts through the outlet 62 by a float-type level controller 63. If desired, the outlets 58 and 62 may employ any other suitable means for maintaining the interfaces 57 and 61 at a desired relatively fixed horizons within the vessel 11.

The baffle 12 and the orifices 13, 14 and 16 have a particular relationship to the interfacial zones 57 and 61 of the oil and water in the outlet separation zone. The flow through the orifices is at a substantial back-pressure compared to the unobstructed flow through openings 17 and 18. Particularly, the magnitude of the back-pressure is automatically determined by the rate of crude oil inflow into the vessel 11. More particularly, the total open area of the orifices, irrespective of their configuration, is correlated to the vertical dimension of the upper and lower horizons in the vessel 11 so that the interfacial zone between the oil and water remains below the upper horizon (outlet 58) in the vessel 11 and above the lower horizon, (opening 17) under all normal rates of flow of incoming fluids through the inlet 15. The hydraulic force moving the heated oil through the orifices 13, 14 and 16 is measured only by a few ounces of force but even these small magnitudes are a relatively substantial pressure differential compared to the unobstructed fluid flow through the openings 17 and 18 in the baffle 12 from the inlet to the outlet separation zones. If the interface 61 should fall sufficiently to expose opening 17, the heated oil could flow beneath the baffle 12 under practically zero pressure differential thereacross. However, the flow of heated oil through the orifice 13, 14 and 16 requires a few ounces of pressure differential which is substantial in comparison to unobstructed flow through opening 17. The driving force for moving the heated oil through these orifices is provided by the different levels of the oil-water interfaces 61 and 61a between the outlet and inlet separation zones. The head of water ($h_w$) is reduced by the head of the oil ($h_o$) in the inlet zone between the same horizontal levels of these two interfacial zones 61 and 61a. For example, the difference in the horizons of the interfacial zones 61 and 61a in the outlet and inlet separation zone may be 6 inches which represents a head $h=(h_w-h_o)$ of approximately 1.5 ounces of driving force.

The total open area of the orifices 13, 14 and 16 can be calculated from well known formuli representing fluid flow through orifices so that all normal rates of flow of the fluids through the inlet 15, the interfacial zones remain below the upper horizons in the inlet and outlet separation zones and above the lower horizon in the vessel 11 at which the oil would pass through the baffle 12 through the openings 17 or 18. The head $h=(h_w-h_o)$ representing the pressure differential across the orifices is proportionate to the oil flow across baffle 12 from zero flow to the maximum design flow rate at the head $h$.

The orifices 13, 14 and 16 may be placed in any suitable arrangement physically as a single opening or by a plurality of openings spaced in any desired vertical or horizontal arrangement in the baffle 12. The orifices are shown spaced vertically in several horizontal rows in the baffle 12. However, the orifices can be arranged in a single line in a horizontal plane along the baffle 12 across the horizontal extent of the vessel 11. In such a manner, the oil would be distributed throughout the horizontal extent of the outlet separation zone adjacent the interface 16. The orifices 13, 14 and 16 are round openings in a preferred form but they may be formed of any opening configurations such as rectangular, elongated, semicircular, arcuate or whatever other shape and form is desired providing that they serve in the same function as has been described.

EXAMPLE

The orifices in the baffle 12 may be readily determined in the following manner:

Flow at inlet 18 (BPD—barrels per day)
    Oil Rate (maximum)    75,000 BPD 0 34° API=
                                .79 specific gravity (240°F)
    Water Rate               3,840 BPD 0
                                .95 specific gravity (240°F)
        Total               78,840 BPD $Q$ = flow rate oil + water = 78,840 BPD = 5.12 cu/ft/sec $Q = AV$ wherein $A$ = area of orifices (sq. ft.)

$V$ = velocity through orifices (ft/sec)

$V = C\sqrt{2gh}$ wherein $C$ = orifice coefficient = .85 (round hole in ¼-inch steel plate)

$g$ = 32.2 ft/sec/sec
$h$ = differential pressure, head of water in feet

For a water head $h_w = 0.5$ feet $$h = h_w - h_o = 0.5(0.95 - 0.79) = 0.08 \text{ ft.}$$

$$Q = AC\sqrt{2gh} \text{ and}$$

$$A = Q/C\sqrt{2gh} = 5.12 \text{ cu. ft/sec}/0.85\sqrt{2(32.2)(0.08)} \text{ ft.}$$

$$= 2.66 \text{ sq. ft.}$$

If the orifices 13, 14, 16 etc. are 1⅛ inch holes then area each orifice = .944 sq. in./144 sq. in./sq. ft.

$$= .0069 \text{ sq. ft.}$$

Number of orifices = 2.66 sq. ft./.0069 sq. ft. = 382 round holes 1⅛ inch diameter It will be apparent that the phase separator illustrated in FIG. 1 maintains the gas-oil interface 57 at some desired horizon by use of the float controller 59 in conjunction with a valve in the oil outlet 58. The gas-oil interface 57 remains substantially at a given horizon given throughout the vessel 11 since opening 18 permits unobstructed flow of gas between separation zones. The oil and water interface 61 in the outlet separation zone is maintained at a substantially constant height by the float controller 63 operating the valve in the water outlet 62. However, the oil and water interface 61a in the inlet separation zone rises and falls in response to the oil flow through the inlet 18. For example, at maximum rates of flow through the inlet 18 the interface 61a will reside as it is shown in FIG. 1. At lesser rates of flow, the interface 61a progresses upwardly proportionate to flow of oil until at zero flow of the oil through the inlet 18 the interface 61a will reside quite closely to the same horizon as that of the interface 61 in the outlet separation zone ($h_w = o$).

It is readily appreciated in the preferred embodiment of the phase separator that three fluid phases are handled in one single vessel in two separation zones. However, only one level controller is required to maintain the oil-water interface 61 in the outlet separation zone while the differential in height $h = (h_w - h_o)$ between the interfaces 61 and 61a in the outlet and inlet separation zones automatically regulates the oil flow through the orifices 13, 14 and 16. Where a gas phase exists, a second level controller 59 operating a valve in oil outlet 58 is required to maintain the second interface 57 at an upper horizon of the vessel. Thus, there is a plurality of separation zones each with a plurality of interfaces which are controlled by the least possible number of level controllers. This is a significant advantage over conventional multiseparation zone units wherein a plurality level control system is required for each separation zone. In addition, the baffle 12 is a non-pressure divider forming the plurality of separation zones.

Figure 2:
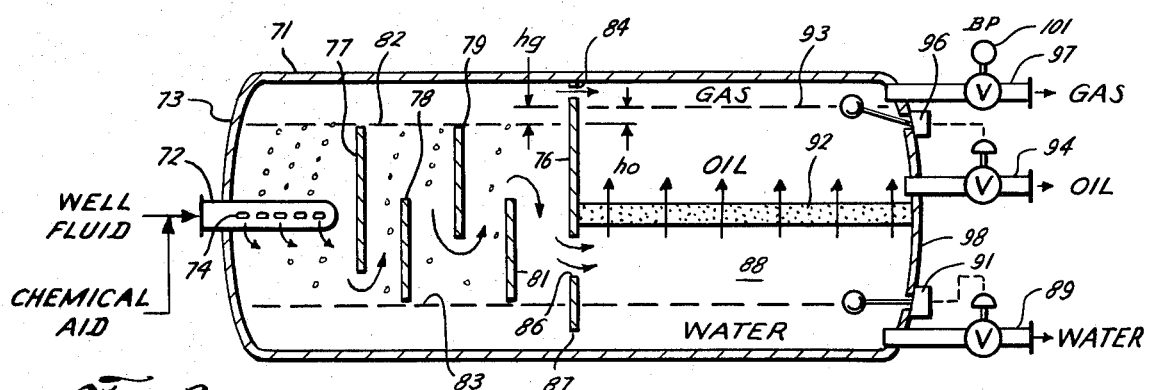
FIG. 2 is a vertical sectional view of a phase separator employing mechanical structures in inlet and outlet separation zones for enhancing the gravitational separation of immiscible fluids.

Referring now to FIG. 2, there is shown an embodiment of the phase separator of the present invention which is adapted to separate a mixture of immiscible fluids into three separate phases gas, hydrocarbon and water. These immiscible fluids can be of any nature but in an example can be a well effluent formed of natural gas, crude oil and water. The phase separator comprises a vessel 71 having an inlet 72 extending through one head 73 into the interior of the vessel. The inlet 72 contains a plurality of openings 74 which may give the incoming fluid a rotary motion so as to provide centrifugal force to assist in separating the immiscible phases. An imperforate baffle 76 is placed within the vessel 71 to provide an inlet separation zone to the left of the baffle and an outlet separation zone to the right of the baffle. The inlet separation zone may contain mechanical or auxiliary means to assist in separating the immiscible phases. A plurality of baffles 77, 78, 79 and 81 extend from side to side within the vessel 71 but terminate at a certain distant space from the top and bottom thereof. The baffles 77 and 79 extend upwardly to the gas-oil interface 82 whereas the baffles 78 and 81 extend downwardly to the oil-water interface 83. Thus, the fluids from the inlet 72 must pass on diverse paths between these baffles on their approach to the baffle 76. This tortuous path provides auxiliary mechanisms to enhance the gravitational separation of the immiscible fluids.

The baffle 76 of thin steel or other suitable imperforate material is secured within the vessel 71 in substantially fluid tightness for providing the separation zones. An orifice 77 in the baffle 76 regulates the discharge of gas between the separation zones. A first large opening 86 in the baffle 76 a short distance below the orifice 84 permits unobstructed passage of oil between the inlet and outlet separation zones. A second enlarged passage 87 in the baffle 76 adjacent its lower extremity permits free passage of water between the inlet and outlet separation zones. The oil-water interface 83 in the outlet separation zone 88 is maintained at a substantially constant level by regulated water withdrawal through the outlet 89 by a float controller 91. The oil freely passes the opening 86 into the outlet separation zone. Then, the oil may then pass through a subsequent mechanical aid to induce coalescence. The auxiliary phase separation mechanism may be a woven wire coalescer 92 extending horizontally throughout the extent of the outlet separation zone 88. Any water coalescing in the filter 92 falls downwardly into the body of water below the interface 83. The oil flows upwardly through the filter 92 and collects below the gas-oil interface 93 in the upper portion of the vessel 71. The oil is removed through the outlet 94 in regulated quantities by a float controller 96. Thus, the interface 93 is regulated at substantially constant horizon within the vessel 71.

The orifice 84 is sized in the same manner as has been described for the orifices 13, 14 and 16 in the preceding embodiment and functions to regulate the flow of gas from the inlet to the outlet separation zones. More particularly, the orifice 84 operates by the difference in heads (of gas and oil) between the level of the interface 93 and the interface 82 in the outlet and inlet separation zones, respectively. The orifice 84 is correlated to the maintenance of the interface 93 below a gas outlet 97 provided in the head 98 of the vessel 71. The flow of gas through the outlet 97 need not be regulated but a back-pressure valve 101 maintains the contents of the vessel 71 at some desired super-atmospheric pressure.

The orifice 84 in the baffle 76 has a total open area, whether formed of a single opening or a plurality of openings, correlated to the vertical dimension between the interfaces 93 and 82 in such a manner that the interfacial zone 93 remains below the upper horizon or outlet 97 and above a lower horizon in the vessel 71 of the oil opening 86. By this means, gas is removed from the outlet 97 and oil from the outlet 94, respectively.

A mixture of the immiscible fluids to enter the inlet 72 may be mixed with chemical aids to assist phase separation. These fluids leave the opening 74 of inlet 72 with a rotary motion upon entering the inlet separation zone of the vessel 71. Free gas passes upwardly to the interface 82 and merges with the gas in the upper portion of the vessel 71. Free water passes downwardly to merge at the interface 83 with the body of water at the bottom of vessel 71. The remaining mixture passes about the baffle 77, 78, 79 and 81 to further separate gas and water therefrom before passing through the opening 86 in the baffle 76. The nearly gas and water-free oil traverses the filter 92 forming a relatively purified body of oil which is removed through the outlet 94. The water is removed through the outlet 89. Through the action of the flow controllers 91 and 96, the interfaces 83 and 93 are maintained at substantially relatively fixed levels within the vessel 71. The interface 82 rises and falls responsively to the rate of gas inflow in the mixture entering through the inlet 72. For example, as the amount of gas is reduced, the interface 82 rises to reduce the driving force for moving gas through the orifice 84 into the outlet separation zone of the vessel 71. Alternatively, an increase in the amount of gas inflow causes the interface 82 to fall thereby increasing the driving force to move greater quantities of gas through the orifice 84 into the outlet separation zone. However, the design is such that with all normal rates of flow the interface 82 can not fall to the extent that it could pass beneath the edge of the opening 86 and thereby uncontrollably flood the oil outlet 94 in the outlet separation zone. It will be apparent that the oil may move freely through the opening 86 and the water through the opening 87 in baffle 76. The orifice 84 meters the flow of gas responsively only to the difference in the heads created by unequal heights of the interfaces 82 and 93. Thus, there is provided in FIG. 2 a phase separator which can handle gas, oil and water mixtures in a plurality of separation zones and only two outlets (oil and water) require level control features.

Figure 3:
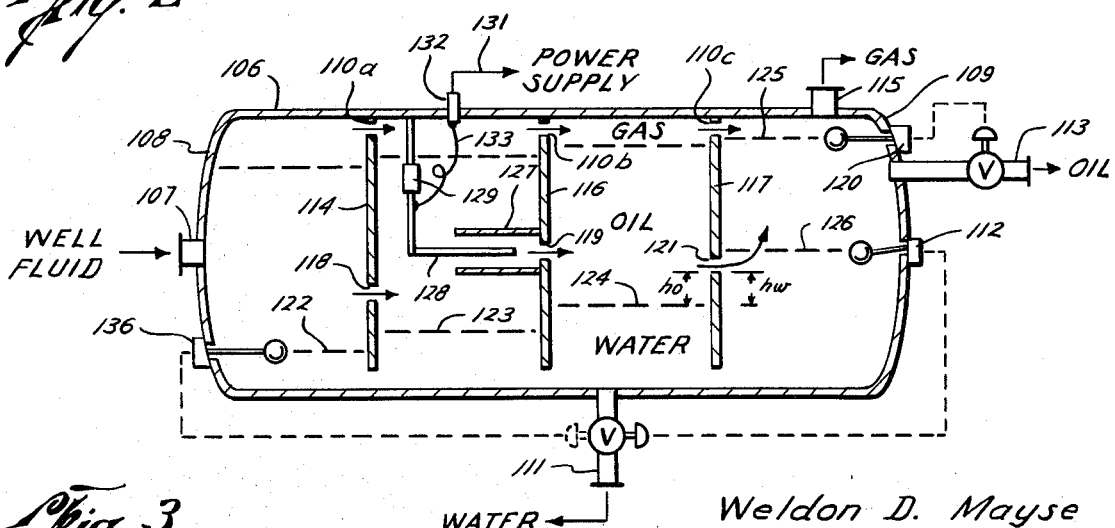
FIG. 3 is a vertical sectional view of a phase separator for resolving mixtures of immiscible liquids having four separation zones.

Referring now to FIG. 3, there is shown yet another embodiment of the phase separator of the present invention which contains a plurality of separation zones. In this particular embodiment, two immiscible fluids are separated. These fluids may be any two fluids as long as they will gravitationally segregate into individual phases. These phases may be hydrocarbon and aqueous phases such as crude oil and water. However, the phase separator is applicable to other immiscible fluids. More particularly, there is shown in FIG. 3 a phase separator comprising a vessel 106 which has an inlet 197 in the head 108. The inlet 107 may provide an open-ended nozzle for introducing fluids into the vessel 106. The opposite head 109 of the vessel carries an outlet 111 to remove water from a lower horizon of the vessel 106. The outlet 111 may be regulated in water outflow by a flow controller 112 of any suitable construction. A second outlet 113 in an upper horizon of the head 109 removes the oil phase.

The vessel 106 is divided into four separation zones by baffles 114, 116 and 117. Each of these baffles is sealed to the vessel and they contain metering orifices 118, 119 and 121, respectively. These orifices may be single opening, or a plurality of openings, of any suitable arrangement across which a pressure drop of a few ounces provides the necessary driving force for moving the oil from one separation zone to another. The driving force or head is obtained from the differential in levels of the oil-water interfaces on opposite sides of each baffle. More particularly, the baffle 114 extends downwardly into the lower portion of the vessel 106. A body of water accumulating within the vessel 106 seals the bottom of the baffle 114 and provide an interface 122 between the oil and water in the first separation zone. The oil flows through the orifice 118 into the second separation zone where an oil-water interface 123 within the vessel 106. The oil flows from the second separation zone through the orifice 119 into the third separation zone and therein forms an oil-water interface 124 within the vessel 106. Similarly, the oil flows from the third separation zone through the orifice 121 into the fourth or outlet separation zone and therein forms an interface 126 between the oil and water. Each baffle has a large lower opening to permit unobstructed flow of water between adjacent separation zones at a lower horizon.

Each of the separation zones may depend entirely upon gravity settling, or they may contain auxiliary phase separation mechanisms for enhancing the gravitational separation of the fluids. These mechanisms may be either splash-plates, electrode assemblies, centrifugal force devices, baffles, wire or hay-pack filters and other suitable materials commonly used for this purpose. For example, the second separation zone contains a concentric-type electrode arrangement wherein a cylindrical grounded electrode 127 is secured to the baffle 116 about the orifice 119. An energized electrode 128 within the cylindrical electrode 127 is held by a suspension system including an insulator 129 extending from the upper portion of the vessel 106. The electrode 128 is energized from an external power supply connected with a conductor 131 on the exterior of the vessel 106 through a bushing 132 in the vessel 106 and then by a conductor 133 connected to the energized electrode 128. Thus, the flow of oil to pass through the orifice 119 is subjected first to the electric field between the electrodes 127 and 128. The electric field promotes coalescence of water remaining in the oil phase. This coalesced water falls downwardly through the interface 123 to mingle with the body of water in the lower portion of vessel 106.

The orifices in the baffles all may be in the oil phase. However, they may be placed in the manner of the orifice 121 and in baffle 117 so that the oil exits below the interface 126, traverses the body of water therein and then enters the oil phase through the interface 126 in the outlet separation zone. The function of the orifice 121 is identical in operation to orifices 118 and 119. More particularly, the driving force or head for moving oil through the orifice 121 is the differential in the heights of the water and oil from the level of the orifice 121 down to the oil-water interface 124 in the third separation zone. Thus, the driving force is the differential or head between $(h_w)$ for the water head and $(h_o)$ for the oil head on opposite sides of the baffle 117 between the interface 124 and the level of the orifice 121.

The level of the water in the various separation zones may be controlled in the described manner by the level controller 112 in regulating flow through the outlet 111. If desired, the level controller 112 can be replaced by a level controller in anyone of the separation zones. For example, the flow controller 136 is illustrated as positioned within the inlet separation zone. The chain-line connection would be made to the valve in the outlet 111. The system would function in exactly the same manner to maintain the identical interfaces 122, 123, 124 and 126 as was illustrated previously for the function of the controller 112.

The phase separator illustrated in FIG. 3 operates in an identical manner as in the preceding embodiments where the immiscible fluids are composed of gas, oil and water. If desired, the system of gas and oil control from FIG. 2 may be incorporated into the phase separator of FIG. 3. All that is required would be to add gas transfer orifices 110a–b to the baffles 114, 116 and 117, a gas outlet 115, and removing oil from the outlet 113 in controlled amounts with a level controller 120 to maintain a relatively constant level in the gas-oil interface 125 in the outlet separation zone. Each of the separation zones may contain auxiliary mechanical devices for enhancing gravitational separation of immiscible fluids.

In the phase separator illustrated in FIG. 2, the gas may be removed from above the inlet separation zone in some instances where such an operation may be desired such as where the separation is substantially complete in the first separation zone and a gas level is desired to be maintained over all separation zones. In such an arrangement, the outlet 97 would be placed through the head 73 and the flow controller 96 maintains the interface 93 at the same level where interface 82 is presently shown. In such an arrangement, the interface 82 then moves upwardly to the same level as the interface 93 now shown. The reason for this result is that the gas phase in the left hand or inlet portion of the vessel 71 is at a reduced pressure because its withdrawal reduces the pressure of the gas phase above the interface 93. Thus, the levels of the gas-oil interfaces 82 and 93 would be interchanged if gas is removed from the inlet separation zone of the vessel 71.

Various modifications and alterations in the described phase separators will be apparent to those skilled in the art which do not depart from the spirit of the present invention. For this reason, these changes are desired to be included within the scope of the appended claims. The appended claims define the present invention; the foregoing description is to be employed for setting forth the present invention embodiments as illustrative and not limitative in nature.

What is claimed is:

1. A phase separator comprising:
   a. a vessel for containing superimposed bodies of immiscible fluids in a plurality of separation zones, said fluids comprising a first fluid and a second fluid with a higher-density than said first fluid, and said fluids being separated vertically by an interfacial zone in each separation zone;
   b. baffle means carried in said vessel with an imperforate portion isolating said vessel into upstream and downstream separation zones relative to the directional flow of said first fluid;

c. said baffle means in said imperforate portion provided with a first passage means for discharging said first fluid from said upstream separation zone into said downstream separation zone with a substantial pressure differential thereacross compared to unobstructed flow, the magnitude of the pressure differential varying with the amount of said first fluid entering said vessel, and said interfacial zone in said downstream separation zone being displaced vertically above said interfacial zone in said upstream separation zone by a vertical dimension proportionate to said pressure differential across said baffle means of said first fluid;

d. a second passage means for providing unobstructed flow for said second fluid between said separation zones at a lower horizon in said vessel;

e. an inlet means in said vessel for introducing said first and second fluids into said upstream separation zone;

f. a first outlet means in said vessel for removing said first fluid from an upper horizon of said downstream separation zone;

g. a second outlet means in said vessel for removing said second fluid from said separation zones adjacent said lower horizon;

h. control means associated with said second outlet means for maintaining said downstream interfacial zone intermediate said upper and lower horizons; and i. said baffle means having the total open area of said first passage means correlated to the vertical dimension of the vertical displacement of said interfacial zones in said upstream and downstream separation zones so that said interfacial zone remains below said upper horizon in said downstream separation zone and above said lower horizon in said vessel for all rates of flow of said first fluid through said inlet means below a predetermined maximum flow rate.

2. The phase separator of claim 1 wherein said control means monitors the interfacial zone in said separation zone adjacent said second outlet means and maintains said interfacial zone at a relatively constant horizon intermediate said upper and lower horizons.

3. The phase separator of claim 1 wherein said control means comprises a float-actuated control valve associated with second outlet means whereby said second fluid is removed at regulated rates to maintain the interfacial zone at a substantially constant horizon intermediate said upper and lower horizons.

4. The phase separator of claim 1 wherein at least one of said separation zones contains auxiliary phase separating means to promote separation of said immiscible fluids as a supplement to the action of gravity.

5. The phase separator of claim 4 wherein said auxiliary phase separating means is selected from heaters, means for creating electrical fields, porous materials, physical and chemical coalescers and mechanical phase separators such as centrifugal-force devices.

6. The phase separator of claim 5 wherein said auxiliary phase separating means includes a heater in one of said separation zones and means for creating an electrical field in another of said separation zones.

7. The phase separator of claim 1 wherein said baffle means provide a plurality of separation zones consisting of inlet and outlet separation zones and one or more intermediate separation zones, and the interfacial zone being maintained below said upper horizon in each separation zone and above lower horizon in said vessel under all normal rates of flow of incoming fluid through said inlet means by correlating the total open area of said first passage means on each said baffle means to the vertical dimension between said upper and lower horizons in said separation zones.

8. A phase separator for a mixture of immiscible first and second liquids wherein the second liquid has a higher density than the first liquid, said separator comprising:

a. a vessel for containing superimposed bodies of the liquids in a plurality of separation zones, said liquids being vertically separated by an interfacial zone in each separation zone;

b. baffle means carried in said vessel with an imperforate portion isolating said vessel into inlet and outlet separation zones on opposite sides of said imperforate portion;

c. said baffle means in said imperforate portion provided with a first passage means for discharging the first liquid from said inlet separation zone into said outlet separation zone with a substantial pressure differential thereacross compared to unobstructed flow, the magnitude of the pressure differential varying with the amount of said first liquid entering said vessel, and said interfacial zone in said outlet separation zone being displaced vertically above said interfacial zone in said inlet separation zone by a vertical dimension proportionate to said pressure differential across said baffle means of said first liquid;

d. a second passage means for providing unobstructed flow for said second liquid between said inlet and outlet separation zones at a lower horizon in said vessel;

e. an inlet means in said vessel for introducing the first and second liquids mixture into the inlet separation zone upstream of said baffle means;

f. a first outlet means in said vessel for removing the first liquid from an upper horizon of said outlet separation zone downstream of said baffle means;

g. a second outlet means in said vessel for removing the second liquid from said separation zones below said lower horizon;

h. control means associated with said second outlet means for maintaining the interfacial zone in said outlet separation zone intermediate said upper and lower horizons; and i. said baffle means having the total open area of said first passage means correlated to the vertical dimension of the vertical displacement of said interfacial zones in said inlet and outlet separation zones so that the interfacial zone remains below said upper horizon in said inlet and outlet separation zones and above said lower horizon in said vessel for all rates of flow of said first liquid through said inlet means below a predetermined maximum flow rate.

9. The phase separator of claim 8 wherein said control means monitors the interfacial zone in said separation zone adjacent said second outlet means and maintains said interfacial zone at a relatively constant horizon intermediate said upper and lower horizons.

10. The phase separator of claim 8 adapted to separate an immiscible gas from said liquids mixture, said separator including:

a. a third passage means in said imperforate portion of said baffle means at a horizon above said upper horizon;

b. said third passage means providing for discharging said gas between said inlet and outlet separation zones in said vessel whereby a second interfacial zone is formed between said gas and said first liquid and said gas being discharged with a substantial pressure differential compared to unobstructed flow and the magnitude of the pressure differential varying with the amount of gas entering said vessel;

c. a third outlet means in said vessel for removing the gas from either of said separation zones above said upper horizon; and d. a second control means associated with said first outlet means for maintaining said second interfacial zone below said horizon at which gas is removed by said third outlet means.

11. The phase separator of claim 8 wherein at least one of said separation zones contains auxiliary phase separating means to promote separation of said immiscible liquids as a supplement to the action of gravity.

12. The phase separator of claim 11 wherein said auxiliary phase separating means is selected from heaters, means for creating electrical fields, porous materials, physical and chemical coalescers and mechanical phase separators such as centrifugal-force devices.

13. The phase separator of claim 12 wherein said auxiliary phase separating means includes a heater in said inlet separation zone and means for creating an electrical field in said outlet separation zone.

14. The phase separator of claim 8 wherein said baffle means provide a plurality of separation zones consisting of an inlet and outlet separation zones and one or more intermediate separation zones, and the interfacial zone being maintained below said upper horizon in each separation zone and above said lower horizon in said vessel under all normal rates of flow of incoming fluid through said inlet means by correlating the total open area of said first passage means on said baffle means to the vertical dimension between said upper and lower horizons in said separation zones.

15. A phase separator for a mixture of immiscible gas and a liquid wherein the liquid has a higher density than the gas, said separator comprising:
 a. a vessel for containing superimposed bodies of the gas and liquid in a plurality of separation zones, said gas and liquid being vertically separated by an interfacial zone in each separation zone;
 b. baffle means carried in said vessel with an imperforate portion isolating said vessel into inlet and outlet separation zones on opposite sides of said imperforate portion;
 c. said baffle means in said imperforate portion provided with a first passage means for discharging the gas from said inlet separation zone into said outlet separation zone with a substantial pressure differential thereacross compared to unobstructed flow, the magnitude of the pressure differential varying with the amount of gas entering said vessel, and said interfacial zone in said outlet separation zone being displaced vertically above said interfacial zone in said inlet separation zone by a vertical dimension proportionate to said pressure differential across said baffle means of said gas;
 d. a second passage means for providing unobstructed flow for said liquid between said inlet and outlet separation zones at a lower horizon in said vessel;
 e. an inlet means in said vessel for introducing the gas and liquid mixture into said inlet separation zone upstream of said baffle means;
 f. a first outlet means in said vessel for removing the gas from an upper horizon of one of said separation zones;
 g. a second outlet means in said vessel for removing the liquid from said separation zones below said lower horizon;
 h. control means associated with said second outlet means for maintaining the interfacial zone in said outlet separation zone intermediate said upper and lower horizons; and
 i. said baffle means having the total open area of said first passage means correlated to the vertical dimension of the vertical displacement of said interfacial zones in said inlet and outlet zones so that the interfacial zone remains below said upper horizon in said inlet and outlet separation zones and above said lower horizon in said vessel for all rates of flow of said gas through said inlet means below a predetermined maximum flow rate.

16. The phase separator of claim 15 wherein said control means monitors the interfacial zone in said separation zone adjacent said second outlet means and maintains said interfacial zone at a relatively constant horizon intermediate said upper and lower horizons.

17. The phase separator of claim 15 wherein said control means comprises a float actuated control valve associated with said second outlet means whereby said liquid is removed at regulated rates to maintain the interfacial zone at a substantially constant horizon intermediate said upper and lower horizons.

18. The phase separator of claim 15 wherein at least one of said separation zones contains auxiliary phase separating means to promote separation of said immiscible gas and liquids as a supplement to the action of gravity.

19. The phase separator of claim 18 wherein said auxiliary phase separating means is selected from heaters, means for creating electrical fields, porous materials, physical and chemical coalescers and mechanical phase separators such as centrifugal-force devices.

20. The phase separator of claim 19 wherein said auxiliary phase separating means includes flow diverting baffles in said inlet separation zones and a physical coalescer in said outlet separation zones.

21. The phase separator of claim 15 wherein said baffle means provide a plurality of separation zones consisting of an inlet and outlet separation zones and one or more intermediate separation zones, and the interfacial zone is maintained below said upper horizon in each separation zone and above said lower horizon in said vessel under all normal rates of flow of incoming fluid through said inlet means by correlating the total open area of said first passage means on said baffle means to the vertical dimension between said upper and lower horizones in said separation zones.

22. A phase separator for a mixture of immiscible first and second liquids wherein the second liquid has a higher density than the first liquid, said separator comprising:
 a. a vessel for containing superimposed bodies of the liquids, in a plurality of separation zones, said liquids being vertically separated by an interfacial zone in each separation zone;
 b. baffle means carried in said vessel with an imperforate portion isolating said vessel into inlet and outlet separation zones on opposite sides of said imperforate portion;
 c. said baffle means in said imperforate portion provided with a first passage means for discharging the first liquid from said inlet separation zone into said outlet separation zone with a substantial pressure differential thereacross compared to unobstructed flow, the magnitude of the pressure differential varying with the amount of the first liquid entering said vessel, and said interfacial zone in said outlet separation zone being displaced vertically above said interfacial zone in said inlet separation zone by a vertical dimension proportionate to said pressure differential across said baffle means of said first liquid;
 d. a second passage means for providing unobstructed flow for said second liquid between said inlet and outlet separation zones at a lower horizon in said vessel;
 e. an inlet means in said vessel for introducing the first and second liquids mixture into the inlet separation zone upstream of said baffle means;
 f. heater means for elevating the temperature of said liquids mounted in said inlet separation zone in fluid communication with said inlet means;
 g. a first outlet means in said vessel for removing the first liquid from an upper horizon of said outlet separation zone downstream of said baffle means;
 h. a second outlet means in said vessel for removing the second liquid from said separation zones below said lower horizon;
 i. control means associated with said second outlet means for maintaining the interfacial zone in said outlet separation zone at a horizon intermediate said upper and lower horizons;
 j. electrode means mounted in said outlet separation zone intermediate said upper horizon and said interfacial zone;
 k. power supply means connected to said energized electrode means for creating an electrical field therebetween in said first liquid to promote separation of said liquids in said outlet separation zone; and
 l. said baffle means having the total open area of said first passage means correlated to the vertical dimension of the vertical displacement of said interfacial zones in said inlet and outlet separation zones so that the interfacial zone remains below said upper horizon in said outlet separation zone and above said lower horizon in said vessel for all rates of flow of said first liquid through said inlet means below a predetermined maximum flow rate.

23. The phase separator of claim 22 adapted to separate an immiscible gas from said liquids mixture, said separator including:
   a. a third passage means in said imperforate portion of said baffle means at a horizon above said upper horizon;
   b. said third passage means providing for unobstructed flow of said gas between said inlet and outlet separation zones in said vessel whereby a second interfacial zone is formed between said gas and said first liquid;
   c. a third outlet means in said vessel for removing the gas from either said separation zones above said upper horizon; and
   d. a second control means associated with said first outlet means for maintaining said second interfacial zone below said horizon at which gas is removed by said third outlet means.

24. The phase separation of claim 22 wherein said heater means is at least partially enclosed by a shroud having an inlet and outlet whereby liquids flow coextensively with said heater means for improved heat exchange efficiency.

25. The phase separator of claim 22 wherein a flow diverter plate is interspaced between said inlet means and said heater means within said inlet separation zone.

26. The phase separator of claim 22 wherein an upright partition resides between said heater means and said baffle means and said upright partition extends vertically to a sufficient dimension that liquids passing from said heater means flow downwardly over said partition towards said first passage means for entry into said outlet separation zone.

27. The phase separator of claim 22 wherein said first passage means are a plurality of small openings aligned in the horizontal and spaced transversly on said baffle means across said vessel whereby liquid entering said outlet separation zone is distributed substantially uniformly into said outlet separation zone.

28. The phase separator of claim 22 wherein said electrode means include a horizontally oriented foraminous metal structure mounted in electrical isolation from said vessel in said outlet separation zone.

* * * * *

UNITED STATES PATENT OFFICE
CERTIFICATE OF CORRECTION

Patent No. 3,672,127　　　　　　　　Dated June 27, 1972

Inventor(s) Weldon D. Mayse and Frederick D. Watson

It is certified that error appears in the above-identified patent and that said Letters Patent are hereby corrected as shown below:

Column 2, line 35, for "none-", read: --- non- ---;
Column 4, line 59, for "75,000 BPDO", read: ---75,000 BPD @ ---;
Column 4, line 60, for "3,840 BPDO", read: --- 3,840 BPD @ ---;

Column 4, line 70, for "V = C 2gh", read:

$$--- V = C \sqrt{2gh} \quad ---;$$

Column 5, line 5, for "Q = AC 2 gh", read:

$$--- Q = AC\sqrt{2\,gh} \quad ---;$$

Column 5, line 6, for "A = Q/C 2 gh = 5.12 cu ft/sec/0.85　2(32.2)(0.08) ft.", read:

$$--- A = \frac{Q}{C\sqrt{2\,gh}} = \frac{5.12 \text{ cu. ft./sec}}{0.85\sqrt{2\,(32.2)(0.08)} \text{ ft.}} \quad ---; \text{ and}$$

Column 7, line 21, for "inlet 197", read: ---inlet 107---.

Signed and sealed this 5th day of December 1972.

(SEAL)
Attest:

EDWARD M. FLETCHER, JR.　　　　　　　　ROBERT GOTTSCHALK
Attesting Officer　　　　　　　　　　　　Commissioner of Patents